Patented Jan. 2, 1923.

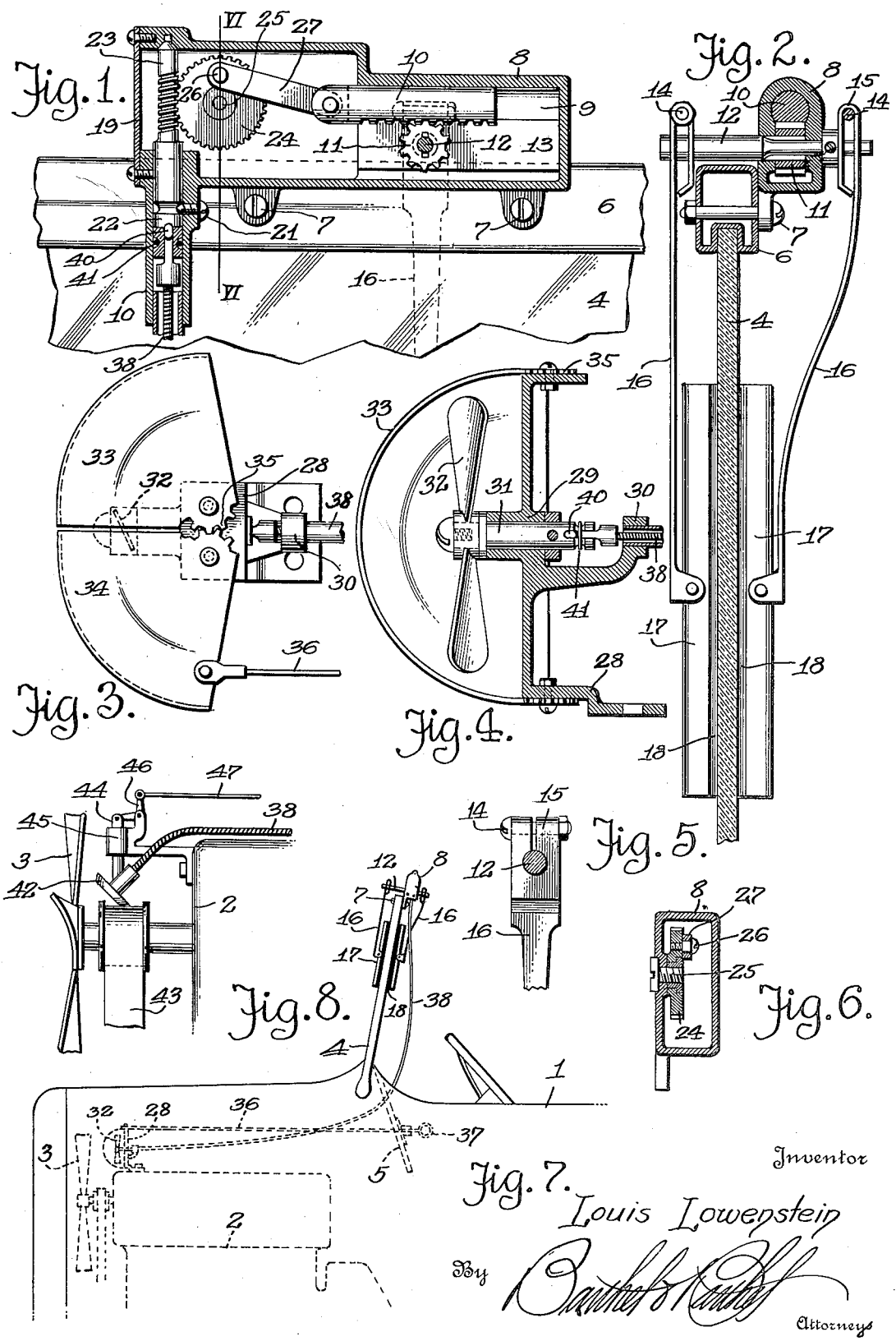

1,441,009

UNITED STATES PATENT OFFICE.

LOUIS LOWENSTEIN, OF DETROIT, MICHIGAN, ASSIGNOR OF ONE-HALF TO HOMER W. HART, OF DETROIT, MICHIGAN.

WINDSHIELD CLEANER.

Application filed April 14, 1921. Serial No. 461,241.

*To all whom it may concern:*

Be it known that I, LOUIS LOWENSTEIN, a citizen of the United States of America, residing at Detroit, in the county of Wayne and State of Michigan, have invented certain new and useful Improvements in Windshield Cleaners, of which the following is a specification, reference being had therein to the accompanying drawings.

This invention relates to a windshield cleaner and my invention aims to provide a windshield attachment which may be automatically operated to scrape or otherwise remove snow, sleet, water, condensation and other matter from both sides of a windshield or transparent plate at the front end of an automobile, whereby the vision of the operator or driver of the automobile will not be obstructed, thus contributing to safe driving.

My invention further aims to provide a windshield cleaner of simple, durable and inexpensive construction that may be easily and quickly attached to a windshield and operated by a wind motor located on the engine of the automobile or by power derived from some driven part of the automobile. Provision is made for controlling the operation of the wind motor or the application of power, so that the windshield may be cleaned at will.

My invention further aims to accomplish the above results by an efficient construction that will be hereinafter described and then claimed, and reference will now be had to the drawings, wherein Figure 1 is a longitudinal sectional view of that portion of the windshield cleaner carried by a windshield;

Fig. 2 is a vertical sectional view of the same;

Fig. 3 is a plan of the wind motor adapted to operate the windshield cleaner;

Fig. 4 is a longitudinal sectional view of the same;

Fig. 5 is an enlarged detail view of a portion of one of the cleaner arms;

Fig. 6 is a cross sectional view taken on the line VI—VI of Fig. 1;

Fig. 7 is a diagrammatic view of a portion of an automobile provided with a windshield cleaner, and Fig. 8 is an elevation of a portion of an automobile engine showing a modified form of device for utilizing the power of the engine to operate the windshield cleaner.

In the drawing, the reference numeral 1 denotes a portion of an automobile having an engine 2 adapted to operate a fan 3 at the forward end of the engine for cooling purposes. The automobile 1 also has the usual type of windshield 4 and dash or instrument board 5.

Attached to the top rail 6 of the windshield 4 by screws 7 or other fastening means is an oblong casing 8 having one end thereof shaped to afford a tubular guide-way 9 for a cylindrical rack 10 which meshes with a pinion 11 mounted on a shaft 12 journaled transversely of the casing 8. The pinion 11 is disposed between cheek pieces or side walls 13 of the casing 8 and when said pinion is rocked or rotated the rack 10 is reciprocated within the casing. The reverse operation takes place in actual use of the mechanism.

Both ends of the shaft 12 protrude from the side walls of the casing 8 with one end of the shaft extending over the top rail 6 of the windshield 4 and clamped on the ends of the rock shaft 12, by screw bolts 14 or other fastening means, are the upper split ends 15 of cleaner arms 16. These arms are preferably made of resilient material with the inner arms slightly bowed or curved so that it will extend in proximity to the inner face of the windshield 4. The lower ends of both arms are provided with pivoted holders 17 for scraper members 18 which may be made of rubber, felt or a yieldable material. By rocking the shaft 12 the arms 16 are swung in an arc and the scraper members 18 caused to clean both sides of the windshield 4, so as to clear a space for observation purposes.

The opposite end of the casing 8, from the guideway 9, has a detachable end plate 19 and a depending bearing 20. Journaled in the bearing 20 and retained therein by a screw 21 or other means is the lower bifurcated end or head 22 of a worm 23, said worm having its upper end bearing in the top wall of the casing 8. The worm 23 meshes with a gear wheel 24 rotatable on a stud shaft 25, carried by the side wall of the casing 8, and said worm wheel has a wrist pin 26 connected by a pitman 27 to the end of the rack 10, so that rotation of the worm 23 may impart a reciprocable movement to the rack 10 to rock the shaft 12.

Mounted on the top of the engine 2, in the rear of the fan 3, is a wind motor comprising a bracket 28 having longitudinally alining bearings 29 and 30. In the bearing 29 is journaled a fan shaft 31 provided with a conventional form of fan 32 and this fan is adapted to be inclosed by opposed shutters 33 and 34. These shutters are pivotally supported by the top and bottom of the bracket 28 and said shutters have meshing rack or gear portions 35 which will cause said shutters to move in unison when either of said shutters is adjusted. As shown in Fig. 3 the shutters are closed and render the fan 32 inactive by a pressure of air against said fan, but said shutters may be adjusted to permit of air operating the fan 32 at a desired speed. This is accomplished by attaching a rod 36 to the shutter 34 and extending said rod rearwardly through the dash or instrument board 5 where it has a suitable handle 37 which permits of the rod being manually shifted to adjust the wind motor shutters.

Connecting the bearings 20 and 30 and extending through the dash or instrument board 5 is a flexible member or conduit 39 containing a flexible shaft 38. One end of the flexible shaft is coupled to the lower end or head 22 of the worm 23 and the opposite end of the flexible shaft is coupled to the fan shaft 31. Each coupling may be in the form of a cross head 40 suitably held in engagement with the worm head or the fan shaft 31 by a ring or band 41.

In lieu of the wind motor I may utilize power from the engine 2 for driving a flexible shaft 38. This may be accomplished by providing the flexible shaft 38 with a friction wheel 42 to engage a driven part of the engine 2, for instance, the belt 43 which drives the fan 3. The friction wheel 42 may be supported by a rod 44 slidable in a bracket 45 carried by the engine 2, and the rod 44 may be attached by a bell crank 46 to an operating rod 47. This will permit of the friction wheel 42 being shifted into and out of engagement with the belt 43 so that the operation of the windshield cleaner can be readily controlled.

It is apparent that with the automobile in operation that a current of air may operate the fan 32, and the current of air may be derived from the fan 3 or by the automobile in motion. In either instance, the supply of air to the fan 32 may be controlled and consequently the power transmitted to the shaft 12. The shaft may be oscillated or rocked until the windshield 4 has been cleaned by the members 18, and from time to time the operation may be repeated, especially during inclement weather, so that there will always be a clean and unobstructed spot on the windshield for observation purposes.

I attach considerable importance to the fact that an installation of the windshield cleaner requires no changes or additions to any well known type of automobile, and it is obvious that the casing 8 and appurtenant parts may be finished to present a neat and attractive appearance.

While in the drawings there are illustrated the preferred embodiments of my invention, it is to be understood that the structural elements are susceptible to such changes in size, shape and manner of assemblage, as fall within the scope of the appended claim.

What I claim is:—

Mechanism adapted for operating a windshield wiper, comprising an oblong casing adapted for attachment to the top rail of a windshield, a cylindrical rack slidable in one end of said casing, a shaft journaled transversely of said casing below said rack and adapted to be rotated thereby, and adapted for swinging a wiper arm, a gear wheel rotatably supported in the opposite end of said casing, a pitman connected to the side of said gear wheel and an end of said rack and adapted for reciprocating said rack, a bearing carried by the bottom of said casing, a worm in said bearing and meshing with said gear wheel to impart rotation thereto, and a flexible shaft extending into said bearing and connected to said worm and adapted to impart rotation to said worm.

In testimony whereof I affix my signature in presence of two witnesses.

LOUIS LOWENSTEIN.

Witnesses:
 ANNA M. DORR,
 KARL H. BUTLER.